(12) United States Patent
Qi et al.

(10) Patent No.: US 7,538,175 B2
(45) Date of Patent: May 26, 2009

(54) PHENOLIC HOLE TRANSPORT POLYMERS

(75) Inventors: Yu Qi, Oakville (CA); Nan-Xing Hu, Oakville (CA); Greg McGuire, Mississauga (CA); Cuong Vong, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 468 days.

(21) Appl. No.: 11/250,296

(22) Filed: Oct. 13, 2005

(65) Prior Publication Data

US 2007/0087276 A1  Apr. 19, 2007

(51) Int. Cl.
C08G 14/06 (2006.01)
C08G 8/02 (2006.01)
C08G 8/04 (2006.01)
C08G 14/02 (2006.01)
G03G 15/02 (2006.01)

(52) U.S. Cl. .................. 528/162; 528/129; 528/128; 430/58.7

(58) Field of Classification Search ............ 528/86, 528/129, 162; 403/58.7
See application file for complete search history.

(56) References Cited

U.S. PATENT DOCUMENTS

| | | | |
|---|---|---|---|
| 3,121,006 A | 2/1964 | Middleton et al. | |
| 4,286,033 A | 8/1981 | Neyhart et al. | |
| 4,291,110 A | 9/1981 | Lee | |
| 4,338,387 A | 7/1982 | Hewitt | |
| 4,563,408 A * | 1/1986 | Lin et al. | 430/58.4 |
| 4,587,189 A | 5/1986 | Hor et al. | |
| 4,664,995 A | 5/1987 | Horgan et al. | |
| 4,918,156 A * | 4/1990 | Rogers | 528/272 |
| 4,956,440 A * | 9/1990 | Limburg et al. | 528/99 |
| 4,959,288 A * | 9/1990 | Ong et al. | 430/58.7 |
| 5,011,939 A * | 4/1991 | Limburg et al. | 548/440 |
| 5,116,708 A * | 5/1992 | Shikatani et al. | 430/58.7 |
| 5,153,298 A * | 10/1992 | Pokora et al. | 528/86 |
| 5,316,880 A * | 5/1994 | Pai et al. | 430/58.6 |
| 5,618,646 A * | 4/1997 | Nogami et al. | 430/58.45 |
| 5,639,581 A * | 6/1997 | Iwasaki et al. | 430/58.7 |
| 5,681,664 A * | 10/1997 | Tamano et al. | 428/690 |
| 5,817,739 A * | 10/1998 | Nukada et al. | 528/292 |
| 5,948,579 A * | 9/1999 | Mashimo et al. | 430/58.7 |
| 6,261,729 B1 * | 7/2001 | Yuh et al. | 430/65 |
| 6,395,440 B1 * | 5/2002 | Yamaguchi et al. | 430/58.7 |
| 6,517,984 B1 * | 2/2003 | Ferrar et al. | 430/58.2 |
| 6,664,361 B2 * | 12/2003 | Sasaki et al. | 528/196 |
| 6,790,572 B2 * | 9/2004 | Tamoto et al. | 430/58.05 |

(Continued)

FOREIGN PATENT DOCUMENTS

EP    1241529 A    9/2002

(Continued)

OTHER PUBLICATIONS

European Search Report dated Jan. 30, 2007.

Primary Examiner—Harold Y Pyon
Assistant Examiner—Liam J Heincer
(74) Attorney, Agent, or Firm—Eugene O. Palazzo; Fay Sharpe LLP

(57) ABSTRACT

A polymer having hole transport functionality and antioxidant properties is disclosed. The polymer comprises a phenolic segment and a hole transport segment. The polymer is suitable for use in the charge transport layer of an imaging member. Processes for producing the polymer are also disclosed.

10 Claims, 1 Drawing Sheet

U.S. PATENT DOCUMENTS

| | | | |
|---|---|---|---|
| 6,861,188 B2* | 3/2005 | Ikegami et al. | 430/58.65 |
| 7,045,261 B2* | 5/2006 | Tanaka et al. | 430/58.05 |
| 7,166,689 B2* | 1/2007 | Sagisaka et al. | 528/422 |
| 7,229,732 B2* | 6/2007 | Hu et al. | 430/74 |
| 7,378,204 B2* | 5/2008 | Qi et al. | 430/58.75 |
| 2002/0119382 A1* | 8/2002 | Nakata et al. | 430/66 |
| 2003/0175603 A1* | 9/2003 | Nakata et al. | 430/58.1 |
| 2003/0207187 A1* | 11/2003 | Seki et al. | 430/58.7 |
| 2003/0232263 A1* | 12/2003 | Ogaki et al. | 430/58.7 |
| 2004/0048179 A1* | 3/2004 | Tanaka et al. | 430/58.7 |
| 2004/0115546 A1* | 6/2004 | Tong et al. | 430/59.6 |
| 2004/0126683 A1* | 7/2004 | Jin et al. | 430/58.2 |
| 2005/0186444 A1* | 8/2005 | Zheng et al. | 428/690 |
| 2005/0233235 A1* | 10/2005 | Qi et al. | 430/66 |
| 2006/0029872 A1* | 2/2006 | Qi et al. | 430/58.8 |
| 2006/0058494 A1* | 3/2006 | Busing et al. | 528/86 |
| 2006/0111588 A1* | 5/2006 | Bender et al. | 564/405 |
| 2006/0229427 A1* | 10/2006 | Becker et al. | 528/86 |
| 2006/0286472 A1* | 12/2006 | Qi et al. | 430/58.75 |
| 2007/0048636 A1* | 3/2007 | Qi et al. | 430/58.75 |

FOREIGN PATENT DOCUMENTS

GB      1299497 A      12/1972

* cited by examiner

PHENOLIC HOLE TRANSPORT POLYMERS

CROSS-REFERENCE TO RELATED APPLICATIONS

There is illustrated in copending U.S. patent application Ser. No. 11/153,663, filed on Jun. 15, 2005, entitled Photoconductive Member, the disclosure of which is totally incorporated herein by reference, a photoconductive imaging member comprising a hole transport molecule comprising a triarylamine component and a phenol component.

BACKGROUND

This disclosure relates, in various embodiments, to phenolic hole transport polymers and/or to electrostatographic imaging members utilizing the same, and more specifically, to imaging members having a layer containing phenolic hole transport polymers comprising a phenolic segment, a hole transport segment, and a divalent linkage.

Electrostatographic imaging members are known in the art. Typical electrostatographic imaging members include photoreceptors for electrophotographic imaging systems and electroreceptors such as ionographic imaging members for electrophotographic imaging systems. They have a number of different configurations. For example, they can comprise a flexible member, such as a flexible scroll or a belt, which may be seamed or unseamed. They can also be a rigid member, such as a rigid support substrate drum. Drum imaging members have a rigid cylindrical supporting substrate bearing one or more imaging layers.

An electrophotographic imaging member is imaged by uniformly depositing an electrostatic charge on the imaging surface of the electrophotographic imaging member and then exposing the imaging member to a pattern of activating electromagnetic radiation, such as light, which selectively dissipates the charge in the illuminated areas of the imaging member while leaving behind an electrostatic latent image in the non-illuminated areas. This electrostatic latent image may then be developed to form a visible image by depositing finely divided electroscopic marking toner particles on the imaging member surface. The resulting visible toner image can then be transferred to a suitable receiving member or substrate such as paper.

An electrophotographic imaging members may comprise a supporting substrate, a charge generating layer, a charge transport layer ("CTL"), and an optional overcoat layer ("OCL"). Depending on the design of the imaging member, either the CTL or an OCL will be the outermost layer and therefore the layer exposed to the operating environment of the imaging member.

The operating environment exposes the imaging member to several conditions which can decrease its service life. It is exposed to several airborne chemical contaminants. Typical chemical contaminants include solvent vapors, environment airborne pollutants, and corona species emitted by machine charging subsystems such as ozone. In some designs, such as a rigid drum design utilizing a contact AC Bias Charging Roller (BCR), ozone species attack on the imaging member can be even more pronounced because of the close vicinity of the BCR to the drum. It is also inevitably subjected to constant mechanical interactions against various electrophotographic imaging machine subsystems under a normal service environment. These mechanical interactions include abrasive contact with cleaning and/or spot blades, exposure to toner particles, carrier beads, toner image receiving substrates, etc. As a result, the imaging member may frequently exhibit mechanical failures such as frictional abrasion, wear, and surface cracking.

Because of environmental conditions, the outermost layer must be designed so that it can withstand those conditions yet still function effectively. Poor mechanical wear resistance may be attributed to the current design of some such layers, especially when the CTL is the outermost layer. A conventional CTL usually comprises a charge transport compound in a film-forming polymeric binder resin. Because the polymeric binder is usually electrically inactive, it is the charge transport compound which supports the injection and transport of photogenerated holes or electrons. An antioxidant is sometimes incorporated as well to reduce the effects of ozone exposure, which attacks the polymer bonds and breaks it down. However, high loading of such compounds adversely affects the electrical characteristics of the imaging member. In addition, oxidation of the charge transport compound, such as a hole transport molecule, arising from poor corona charging resistance can cause lateral charge migration (LCM). Image deletion may also occur. Antioxidants may also escape during heating of the outermost layer.

It is desired to provide a composition which balances good mechanical properties with good electrical and printing performance and which may also be used as a hole transport polymer.

BRIEF DESCRIPTION

There are disclosed in various embodiments herein, compositions, which when used in an imaging member, provide desired electrical properties, such as minimal dark injection, good photoinduced discharge characteristics, cyclic and environmental stability, acceptable charge deficient spot levels arising from dark injection of charge carriers, and substantially no adverse changes in performance over extended time periods, and good mechanical properties, such as scratch resistance and corona resistance. There are also disclosed imaging members having a layer comprising the compositions.

In embodiments, the composition is a polymer comprising segments having hole transport functionality and antioxidant properties. The phenolic hole transport polymer provides desired electrical properties, good corona resistance, and good scratch resistance.

In an exemplary embodiment, the polymer comprises a phenolic segment, a hole transport segment, and a divalent linkage. In further embodiments, the hole transport segment is a tertiary arylamine. In a further embodiment, the phenolic segment is p-cresol and the hole transport segment is 3,4-dimethylphenyl-diphenylamine. In still another embodiment, the phenolic segment is 4-ethoxyphenol and the hole transport segment is 3,4-dimethylphenyl-diphenylamine.

In a further embodiment, one segment crosslinks to two or three of the other segment.

Processes for making such polymers are also provided.

In another exemplary embodiment, an imaging member having a layer comprising a phenolic hole transport polymer is disclosed. In specific embodiments, the layer is a charge transport layer, especially a hole transport layer, or an overcoat layer. In further embodiments, the hole transport polymer of the layer comprises two segments: a phenolic segment and a hole transport segment. In further embodiments, the outermost layer of the imaging layer comprises the phenolic hold transport polymer. Also disclosed herein are methods of imaging utilizing the imaging members and phenolic hole transport polymers described and/or illustrated herein.

These and other non-limiting features or characteristics of the disclosed embodiment are set forth below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION OF THE DRAWINGS

Figure 1:
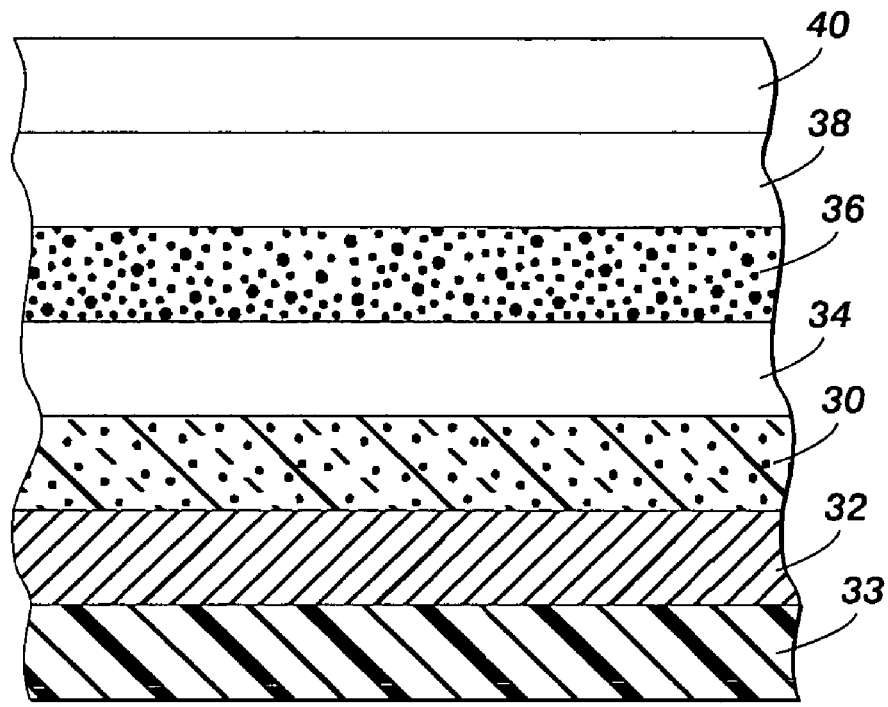
FIG. 1 is an exemplary embodiment of an imaging member of the present disclosure.

The imaging members of this disclosure can be used in a number of different known imaging and printing processes including, for example, electrophotographic imaging processes, especially xerographic imaging and printing processes wherein charged latent images are rendered visible with toner compositions of an appropriate charge polarity. Moreover, the imaging members of this disclosure are also useful in color xerographic applications, particularly high-speed color copying and printing processes. In these applications, the imaging members are in embodiments sensitive in the wavelength region of from about 500 to about 900 nanometers, and in particular from about 650 to about 850 nanometers; thus, diode lasers can be selected as the light source.

The exemplary embodiments of this disclosure are more particularly described below with reference to the drawings. Although specific terms are used in the following description for clarity, these terms are intended to refer only to the particular structure of the various embodiments selected for illustration in the drawings and not to define or limit the scope of the disclosure. The same reference numerals are used to identify the same structure in different Figures unless specified otherwise. The structures in the Figures are not drawn according to their relative proportions and the drawings should not be interpreted as limiting the disclosure in size, relative size, or location. In addition, though the discussion will address negatively charged systems, the imaging members of the present disclosure may also be used in positively charged systems.

An exemplary embodiment of an imaging member of the present disclosure is illustrated in FIG. 1. The substrate 32 has an optional conductive layer 30. An optional hole blocking layer 34 can also be applied, as well as an optional adhesive layer 36. The charge generating layer 38 is located between the substrate 32 and the charge transport layer 40. An optional anti-curl back layer 33 is applied to the side of the substrate 32 opposite from the electrically active layers to keep the imaging member flat. In this embodiment, the outermost layer of the imaging member is the charge transport layer (CTL) 40. The CTL comprises the phenolic hole transport polymer of the present disclosure.

Figure 2:
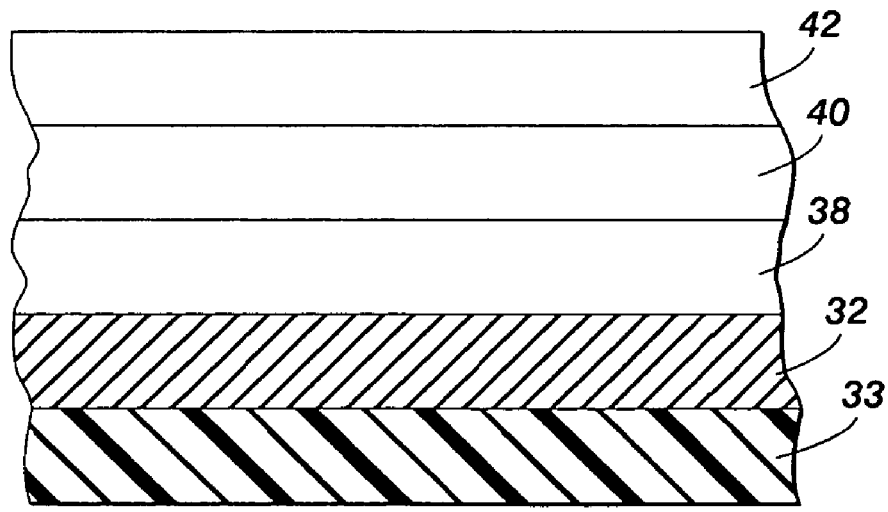
FIG. 2 is another exemplary embodiment of an imaging member of the present disclosure.

Another exemplary embodiment of an imaging member of the present disclosure is illustrated in FIG. 2. Here, the optional layers are not used; the substrate is a conductive material. In addition, an over coat layer (OCL) 42 is included and is the outermost layer of this imaging member. The OCL comprises the phenolic hole transport polymer disclosed herein.

The phenolic hole transport polymer (PHTP) of the present disclosure comprises two segments, one having hole transport functionality and one having antioxidant properties. The segments are linked together by divalent linkages. In embodiments, one segment is a hole transport segment which provides hole transport functionality and the other segment is a phenolic segment which provides antioxidant properties. These segments may also be referred to as a tertiary arylamine and a phenol; the segments may also be substituted.

Generally, the PHTP of the present disclosure comprises a phenolic segment (A), a hole transport segment (B), and a divalent linkage (D) as shown below:

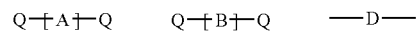

wherein Q indicates a link site from a segment A or B to a divalent linkage D; and wherein D is alkylene containing from 1 to 15 carbon atoms and optionally containing a heteroatom selected from the group consisting of oxygen, sulfur, silicone, and nitrogen. The phenolic segment and hole transport segment shown above should not be interpreted as having only two link sites; rather, they should be interpreted as having at least two link sites.

In further specific embodiments, the phenolic segment A may be represented by Formula (I):

wherein $R_1$, $R_2$, $R_3$, $R_4$ and $R_5$ are independently selected from a link site (Q), carbonylalkyl having from about 1 to about 20 carbon atoms, carboxylalkyl having from about 1 to about 20 carbon atoms, amine, hydroxyl, alkoxy having from about 1 to about 20 carbon atoms, aryloxy having from about 6 to about 60 carbon atoms, alkyl having from about 1 to about 30 carbon atoms, aryl having from about 6 to about 60 carbon atoms, halo-substituted alkyl having from about 1 to about 20 carbon atoms, hydrogen, and halogen; and wherein at least two of $R_1$, $R_2$, $R_3$, $R_4$ and $R_5$ are link sites (Q).

In further specific embodiments, the hole transport segment B may be represented by Formula (II):

wherein $Ar^1$, $Ar^2$, $Ar^3$ and $Ar^4$ are independently a substituted or unsubstituted aryl group, $Ar^5$ is a substituted or unsubstituted aryl or arylene group; k is 0 or 1; and wherein at least two of $Ar^1$, $Ar^2$, $Ar^3$ and $Ar^4$ are a link site (Q). The substituted groups are selected from a group consisting of an alkyl of C1~C20, an aryl of C6~C60, a halogen atom such as fluorine, chlorine, bromine and iodine, an halo-substituted alkyl of C1~C20, an halo-substituted aryl of C6~C60, an alkoxy of C1~C20, an alkoxyalkyl of C1~C20, alkoxyaryl of C7~C60, aryloxy of C7~C60 and the like. In specific embodiments, the hole transport segment is a tertiary arylamine.

In a specific embodiment, the PHTP is represented by Formula (III) as shown below:

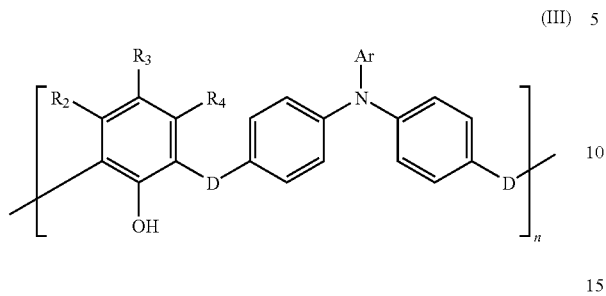
(III)

wherein $R_2$, $R_3$, and $R_4$ are independently selected from carbonylalkyl having from about 1 to about 20 carbon atoms, carboxylalkyl having from about 1 to about 20 carbon atoms, amine, hydroxyl, alkoxy having from about 1 to about 20 carbon atoms, aryloxy having from about 6 to about 60 carbon atoms, alkyl having from about 1 to about 30 carbon atoms, aryl having from about 6 to about 60 carbon atoms, halo-substituted alkyl having from about 1 to about 20 carbon atoms, hydrogen, and halogen. The PHTP of Formula (III) has an average molecular weight ranging from about 1,000 to about 500,000.

In an exemplary embodiment, the PHTP is of Formula (III), D is methylene, and Ar is 3,4-dimethylphenyl or biphenyl. In another exemplary embodiment, the PHTP is of Formula (III), D is methylene, $R_2$ and $R_4$ are hydrogen, $R_3$ is methyl or ethoxyl, and Ar is 3,4-dimethylphenyl. The preferred groups for $R_3$ are alkoxy such as ethoxy, methoxy, and propoxy.

Other specific PHTPs include the following 12 polymers having formulas (III-a) through (III-p):

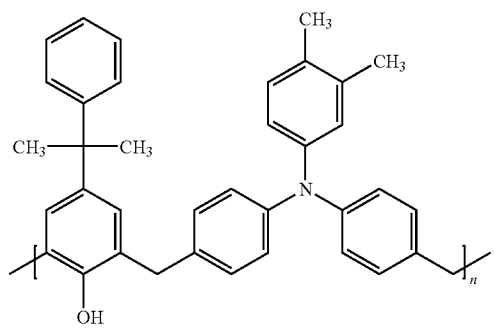
(III-a)

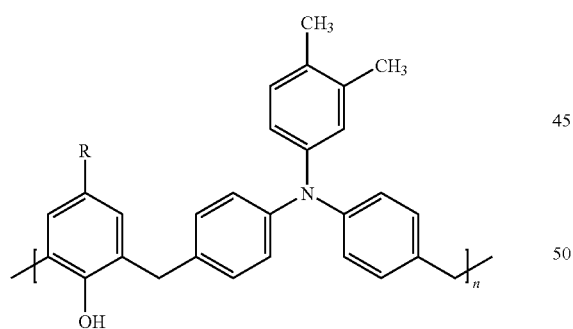
(III-b)

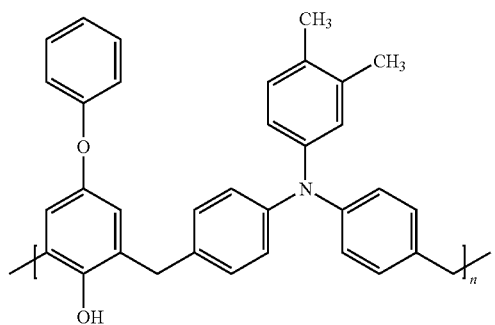
(III-c)

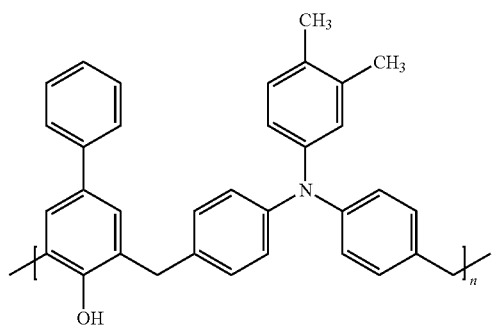
(III-d)

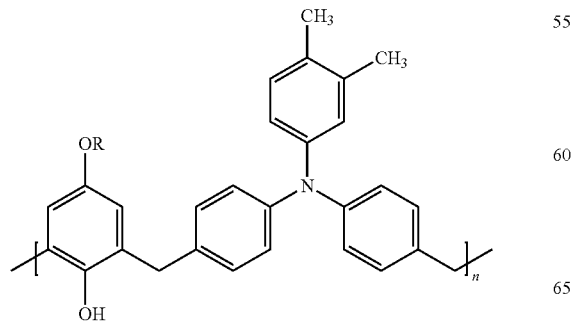
(III-e)

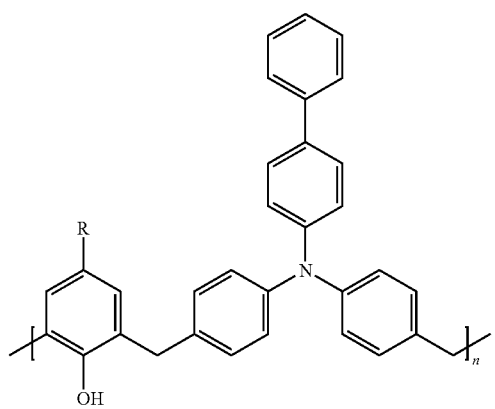
(III-f)

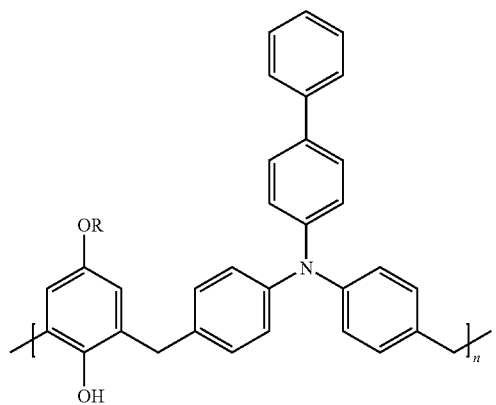

(III-g)

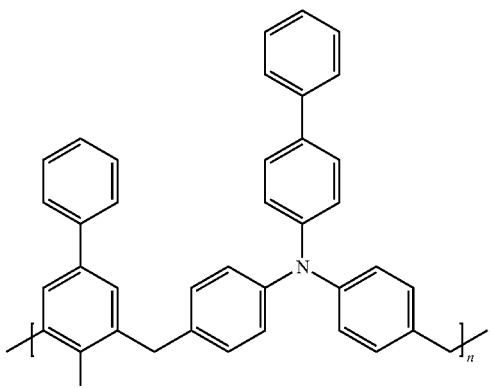

(III-k)

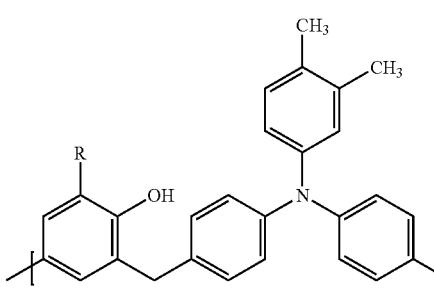

(III-m)

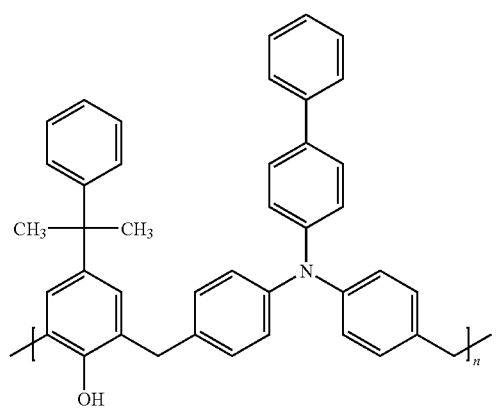

(III-h)

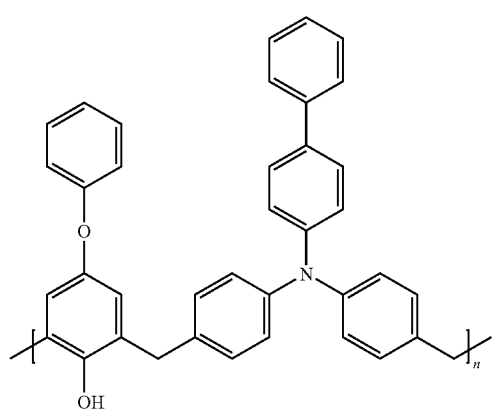

(III-j)

wherein R is alkyl or halo-substituted alkyl having from 1 to 20 carbon atoms and n is the degree of polymerization. Note that (III-m) and (III-p) differ from the other PHTPs in the location of the hydroxyl group in relation to the divalent linkage connecting the two segments.

A PHTP of the present disclosure can be prepared by the condensation of, for example, a bis(alkylhydroxy)-triarylamine with a phenolic monomer in the presence of a small amount of catalyst such as oxalic acid, zinc acetate, or aluminum acetylacetonate. In the PHTP, the phenolic segment and the hole transport segment may be present in a molar ratio of from 1:9 to 9:1.

In one embodiment, the PHTP is made from a tertiary arylamine and a phenol, both of which are provided. The hole transport segment is prepared from the tertiary arylamine; procedures are well-known for preparing a tertiary arylamine. The tertiary arylamine may then be formylated, or in other words, a —CHO group is formed on at least two of the three aryl constituents of the triarylamine. Each formyl group is then reduced to form a hydroxyalkyl group; there may be two or three such hydroxyalkyl groups on the tertiary arylamine; this will be referred to as a hydroxyalkyl-triarylamine. The resulting hydroxyalkyl-triarylamine is then mixed with the phenol in the presence of a catalyst and the mixture is condensed to form a PHTP.

The resulting PHTP shows good electrical properties, corona resistance, scratch resistance, deletion resistance, and good adhesion. When used in the outermost layer of an imaging member, such as a charge transport layer (CTL) or an overcoat layer (OCL), it may also possess a much higher antioxidant concentration compared to traditional imaging member layers comprising an antioxidant. Traditional layers usually comprise only up to 5 weight percent ("wt-%") antioxidant, based on the total weight of the layer, before electrical characteristics is sacrificed. In the PHTP of the present disclosure, the wt-% antioxidant is calculated as the total weight of the phenolic segments (which provides antioxidant functionality) divided by the total weight of the phenolic segments and the hole transport segments. The PHTP may comprise from about 10 to about 80 wt-% antioxidant. In other embodiments, the PHTP may comprise from about 15 to about 50 wt-% antioxidant. In other words, the phenolic segment may comprise from about 10 to 80 wt-% or from about 15 to about 50 wt-% of the polymer. The PHTP may also be crosslinked.

In other embodiments, the PHTP may also be mixed with other polymeric materials, such as MAKROLON. For example, when mixed with MAKROLON, adhesion is strengthened. While the PHTP is usually used in the outermost layer of the imaging member, this is not required and the present disclosure contemplates embodiments where, e.g., the CTL comprises the PHTP and an OCL is provided over the CTL.

As previously mentioned, the PHTP of the present disclosure may be used in an imaging member having a substrate, optional anti-curlback layer, optional conductive layer, optional hole blocking layer, optional adhesive layer, charge generating layer, charge transport layer (especially a hole transport layer), and optional overcoat layer. These layers will now be described with reference to FIGS. 1-2.

The substrate support 32 provides support for all layers of the imaging member. Its thickness depends on numerous factors, including mechanical strength, flexibility, and economical considerations; the substrate for a flexible belt may, for example, be from about 50 micrometers to about 150 micrometers thick, provided there are no adverse effects on the final electrophotographic imaging device. The substrate support is not soluble in any of the solvents used in each coating layer solution, is optically transparent, and is thermally stable up to a high temperature of about 150° C. A typical substrate support is a biaxially oriented polyethylene terephthalate. Another suitable substrate material is a biaxially oriented polyethylene naphtahlate, having a thermal contraction coefficient ranging from about $1\times10^{-5}/°$ C. to about $3\times10^{-5}/°$ C. and a Young's Modulus of between about $5\times10^5$ psi and about $7\times10^5$ psi. However, other polymers are suitable for use as substrate supports. The substrate support may also be made of a conductive material, such as aluminum, chromium, nickel, brass and the like. Again, the substrate support may flexible or rigid, seamed or seamless, and have any configuration, such as a plate, drum, scroll, belt, and the like.

The optional conductive layer 30 is present when the substrate support 32 is not itself conductive. It may vary in thickness depending on the optical transparency and flexibility desired for the electrophotographic imaging member. Accordingly, when a flexible electrophotographic imaging belt is desired, the thickness of the conductive layer may be between about 20 Angstrom units and about 750 Angstrom units, and more specifically between about 50 Angstrom units and about 200 Angstrom units for an optimum combination of electrical conductivity, flexibility and light transmission. The conductive layer may be formed on the substrate by any suitable coating technique, such as a vacuum depositing or sputtering technique. Typical metals suitable for use as the conductive layer include aluminum, zirconium, niobium, tantalum, vanadium, hafnium, titanium, nickel, stainless steel, chromium, tungsten, molybdenum, and the like.

An optional anti-curl back coating 33 can be applied to the back side of the substrate support 32 (which is the side opposite the side bearing the electrically active coating layers) in order to render flatness. Although the anti-curl back coating may include any electrically insulating or slightly semi-conductive organic film forming polymer, it is usually the same polymer as used in the charge transport layer polymer binder. An anti-curl back coating from about 7 to about 30 micrometers in thickness is found to be adequately sufficient for balancing the curl and render imaging member flatness.

The optional hole blocking layer 34 forms an effective barrier to hole injection from the adjacent conductive layer into the charge generating layer. Examples of hole blocking layer materials include gamma amino propyl triethoxyl silane, zinc oxide, titanium oxide, silica, polyvinyl butyral, phenolic resins, and the like. Hole blocking layers of nitrogen containing siloxanes or nitrogen containing titanium compounds are disclosed, for example, in U.S. Pat. Nos. 4,291, 110, 4,338,387, 4,286,033 and 4,291,110, the disclosures of these patents being incorporated herein in their entirety. The blocking layer may be applied by any suitable conventional technique such as spraying, dip coating, draw bar coating, gravure coating, silk screening, air knife coating, reverse roll coating, vacuum deposition, chemical treatment and the like. The blocking layer should be continuous and more specifically have a thickness of between about 0.2 and about 2 micrometers.

An optional adhesive layer 36 may be applied to the hole blocking layer. Any suitable adhesive layer may be utilized. One well known adhesive layer includes a linear saturated copolyester consists of alternating monomer units of ethylene glycol and four randomly sequenced diacids in a ratio of four diacid units to one ethylene glycol unit and has a weight average molecular weight of about 70,000 and a T~ of about 32° C. If desired, the adhesive layer may include a copolyester resin. The adhesive layer including the polyester resin is applied to the blocking layer. Any adhesive layer employed should be continuous and, more specifically, have a dry thickness between about 200 micrometers and about 900 micrometers and, even more specifically, between about 400 micrometers and about 700 micrometers. Any suitable solvent or solvent mixtures may be employed to form a coating solution of the polyester. Typical solvents include tetrahydrofuran, toluene, methylene chloride, cyclohexanone, and the like, and mixtures thereof. Any other suitable and conventional technique may be used to mix and thereafter apply the adhesive layer coating mixture to the hole blocking layer. Typical application techniques include spraying, dip coating, roll coating, wire wound rod coating, and the like. Drying of the deposited coating may be effected by any suitable conventional technique such as oven drying, infra red radiation drying, air drying, and the like.

Any suitable charge generating layer 38 ("CGL") may be applied which can thereafter be coated over with a contiguous CTL. The CGL generally comprises a charge generating material and a film-forming polymer binder resin. Charge generating materials such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof may be appropriate because of their sensitivity to white light. Vanadyl phthalocyanine, metal free phthalocyanine and tellurium alloys are also useful because these materials provide the additional benefit of being sensitive to infrared light. Other charge generating materials include quinacridones, dibromo anthanthrone pigments, benzimidazole perylene, substituted 2,4-diamino-triazines, polynuclear aromatic quinones, and the like. Benzimidazole perylene compositions are well known and described, for example, in U.S. Pat. No. 4,587,189, the entire disclosure thereof being incorporated herein by reference. Other suitable charge generating materials known in the art may also be utilized, if desired. The charge generating materials selected should be sensitive to activating radiation having a wavelength between about 600 and about 700 nm during the imagewise radiation exposure step in an electrophotographic imaging process to form an electrostatic latent image.

Any suitable inactive film forming polymeric material may be employed as the binder in the CGL 38, including those described, for example, in U.S. Pat. No. 3,121,006, the entire disclosure thereof being incorporated herein by reference. Typical organic polymer binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl butyral, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly (amideimide), styrene-butadiene copolymers, vinylidenechloride-vinylchloride copolymers, vinylacetate-vinylidene-chloride copolymers, styrene-alkyd resins, and the like.

The charge generating material can be present in the polymer binder composition in various amounts. Generally, from about 5 to about 90 percent by volume of the charge generating material is dispersed in about 10 to about 95 percent by volume of the polymer binder, and more specifically from about 20 to about 30 percent by volume of the charge generating material is dispersed in about 70 to about 80 percent by volume of the polymer binder.

The CGL generally ranges in thickness of from about 0.1 micrometer to about 5 micrometers, and more specifically has a thickness of from about 0.3 micrometer to about 3 micrometers. The CGL thickness is related to binder content. Higher polymer binder content compositions generally require thicker layers for charge generation. Thickness outside these ranges can be selected in order to provide sufficient charge generation.

The CTL 40 may comprise any material capable of supporting the injection of photogenerated holes or electrons from the CGL 38 and allowing their transport through the CTL to selectively discharge the surface charge on the imaging member surface. The CTL, in conjunction with the CGL, should also be an insulator to the extent that an electrostatic charge placed on the CTL is not conducted in the absence of illumination. It should also exhibit negligible, if any, discharge when exposed to a wavelength of light useful in xerography, e.g., about 4000 Angstroms to about 9000 Angstroms. This ensures that when the imaging member is exposed, most of the incident radiation is used in the CGL beneath it to efficiently produce photogenerated holes.

The CTL comprises a charge transport compound which supports the injection and transport of photogenerated holes or electrons. In embodiments of the present disclosure, the CTL is a hole transport layer. Examples of charge transport compounds include, but are not limited to, triphenylmethane; bis(4-diethylamine-2-methylphenyl) phenylmethane; stilbene; hydrazone; an aromatic amine comprising tritolylamine; arylamine; enamine phenanthrene diamine; N,N'-bis(4-methylphenyl)-N,N'-bis[4-(1-butyl)-phenyl]-[p-terphenyl]-4,4'-diamine; N,N'-bis(3-methylphenyl)-N,N'-bis[4-(1-butyl)-phenyl]-[p-terphenyl]-4,4'-diamine; N,N'-bis(4-t-butylphenyl)-N,N'-bis[4-(1-butyl)-phenyl]-[p-terphenyl]-4,4'-diamine; N,N,N',N'-tetra[4-(1-butyl)-phenyl]-[p-terphenyl]-4,4'-diamine; N,N,N',N'-tetra[4-t-butyl-phenyl]-[p-terphenyl]-4,4'-diamine; N,N'-diphenyl-N,N'-bis(4-methylphenyl)-1,1'-biphenyl4,4'-diamine; N,N'-bis(4-methylphenyl)-N,N'-bis(4-ethylphenyl)-1,1'-(3,3'-dimethylbiphenyl)-4,4'-diamine; 4,4'-bis(diethylamino)-2,2'-dimethyltriphenylmethane; N,N'-diphenyl-N,N'-bis(3-methylphenyl)-[1,1'-biphenyl]4,4'-diamine; N,N'-diphenyl-N,N'-bis(alkylphenyl)-1,1'-biphenyl-4,4'-diamine; and N,N'-diphenyl-N,N'-bis(chlorophenyl)-1,1'-biphenyl-4,4'-diamine. Combinations of different charge compounds are also contemplated so long as they are present in an effective amount. The charge transport compound may comprise from about 10 to about 90 wt-% of the CTL, based on the total weight of the CTL.

The CTL further comprises a film-forming polymer binder resin which, when dried, forms a polymer matrix. In embodiments where the CTL is the outermost layer, the polymer binder comprises the PHTP of the present disclosure. The polymer binder may also comprise a thermoplastic organic polymer including, but not limited to, polycarbonate, polystyrene, polyester, polyarylate, polyacrylate, polyether, polysulfone, and the like. For example, the polymer binder can be either a poly(4,4'-isopropylidene diphenyl carbonate) or a poly(4,4'-diphenyl-1,1'-cyclohexane carbonate). The weight average molecular weight of the polymer binder can vary from about 50,000 to about 2,500,000. The polymer binder may comprise from about 10 to about 90 wt-% of the CTL, based on the weight of the CTL.

The CTL may also comprise additional components. Particles, such as polytetrafluoroethylene (PTFE), may be added to increase wear resistance and photoelectrical performance. An antioxidant, such as a hindered phenol or pentaerythritol tetrakis(3,5-di-tert-butyl-4-hydroxyphenyl)cinnamate (available as IRGANOX™ 1010), may be added. The antioxidant can comprise from about 1 to about 15 wt-% of the CTL, based on the total weight of the CTL, but usually does not exceed 8 wt-%. The CTL may also contain a light shock resisting or reducing agent comprising from about 1 to about 6 wt-%. Such light shock resisting agents include 3,3',5,5'-tetra(t-butyl)-4,4'-diphenoquinone (DPQ); 5,6,11,12-tetraphenyl naphthacene (Rubrene); 2,2'-[cyclohexylidenebis [(2-methyl-4,1-phenylene)azo]]bis[4-cyclohexyl-(9Cl)]; perinones; perylenes; and dibromo anthanthrone (DBA).

In general, the ratio of the thickness of the CTL to the CGL is maintained from about 2:1 to about 200:1 and in some instances as great as about 400:1. However, the CTL is generally between about 5 micrometers and about 100 micrometers thick. Thicknesses outside this range can also be used provided that there are no adverse effects.

Any suitable technique may be used to form the CTL. Generally, the components of the CTL are mixed into an organic solvent to form a coating solution. Typical solvents comprise methylene chloride, toluene, tetrahydrofuran, and the like. Typical application techniques include extrusion die coating, spraying, roll coating, wire wound rod coating, and the like. Drying of the coating solution may be effected by any suitable conventional technique such as oven drying, infra red radiation drying, air drying and the like. When the CTL comprises multiple sublayers, each sublayer is solution coated, then completely dried at elevated temperatures prior to the application of the next sublayer. This procedure is repeated for each sublayer to produce the CTL.

An optional overcoat layer (OCL) 42 may be formed over the CTL to provide additional mechanical protection to the other layers of the imaging member. In embodiments where an OCL is provided, the OCL may comprise the PHTP of the present disclosure. The OCL may comprise a film-forming polymer binder resin which provides the additional protection. For example, the polymer binder may be a polycarbonate, polyester or a polysiloxane. The polymer binder usually comprises from about 10 to 90 wt-% of the OCL, based on the total weight of the OCL. The OCL should also exhibit negligible, if any, discharge when exposed to a wavelength of light useful in xerography, e.g., about 4000 Angstroms to about 9000 Angstroms. The OCL may also comprise other components, such as fillers or a charge transport compound. The OCL is usually from about 1 to about 10 micrometers thick. It is formed in the same manner as the CTL. The OCL may be crosslinked.

An electrophotographic imaging member may also include an optional ground strip layer. The ground strip layer may comprise any suitable film forming polymer binder and electrically conductive particles. Typical ground strip materials include those enumerated in U.S. Pat. No. 4,664,995, the entire disclosure of which is incorporated by reference herein. The ground strip layer may have a thickness from about 7 micrometers to about 42 micrometers, and more specifically from about 14 micrometers to about 23 micrometers.

In a specific embodiment of an imaging member, the CTL comprises the PHTP of the present disclosure. In another specific embodiment, the OCL comprises the PHTP. In general, the outermost layer of the imaging member comprises the PHTP.

The imaging member formed may have a rigid drum configuration or a flexible belt configuration. The belt can be either seamless or seamed. The prepared imaging member may then be employed in any suitable and conventional electrophotographic imaging process which utilizes uniform charging prior to imagewise exposure to activating electromagnetic radiation. When the imaging surface of an electrophotographic member is uniformly charged with an electrostatic charge and imagewise exposed to activating electromagnetic radiation, conventional positive or reversal development techniques may be employed to form a marking material image on the imaging surface of the electrophotographic imaging member of this disclosure. Thus, by applying a suitable electrical bias and selecting toner having the appropriate polarity of electrical charge, one may form a toner image in the charged areas or discharged areas on the imaging surface of the electrophotographic member of the present disclosure.

The imaging member comprising the PHTP may be used in imaging. This method comprises generating an electrostatic latent image on the imaging member. The latent image is then developed and transferred to a suitable substrate, such as paper.

The development of the present disclosure will further be illustrated in the following non-limiting working examples, it being understood that these examples are intended to be illustrative only and that the disclosure is not intended to be limited to the materials, conditions, process parameters and the like recited herein. All proportions are by weight unless otherwise indicated.

EXAMPLE 1

Preparation of dihydroxymethyl-triarylamine monomer

Dimethyl-TPA (48 g, 0.1757 mole) (I), or 3,4-dimethylphenyl-diphenylamine, was mixed in 64.2 g of DMF in a 500 mL 3-neck round-bottomed flask equipped with a magnetic stirrer, an argon introduction tube and a dropping funnel. To the mixture was dropped phosphorus oxychloride (134.71 g, 0.8785 mole) while the temperature was maintained below 80° C. Upon completion of $POCl_3$ addition, the resulting solution was stirred at 80° C. overnight. Cooled to root temperature and diluted with 50 mL of DMF, the solution was poured into 1.5 L of water and stirred for 3 hours. The resulting grey-greenish solid was collected by filtration and washed with the same amount of water twice. Drying in an oven at 40° C. over 2 days gave 46.4 g (80.3%) of bis(formyl)-dimethyl-TPA (II), or bis(4-formylphenyl)-3,4-dimethylphenylamine, which was used without further purification.

Reduction of bis(formyl)-dimethyl-TPA

Bis(formyl)-dimethyl-TPA (II) (46.4 g, 0.1409 mole) was mixed with 1 L of ethanol in a 2 L 3-neck round-bottomed flask equipped with a magnetic stirrer and an argon introduction tube. 0.1 g of NaOH and 5.33 g of $NaBH_4$ was added to the suspension. A lot of bubbles formed and the suspension gradually turned into a clear solution gradually. The resulting solution was stirred until thin layer chromatography showed the complete disappearance of the starting materials and the mono intermediate. The reaction was carried out for a total of about 1 hour. The solution was poured into 2.5 L of water and the resulting solids were collected by filtration. The crude product was purified by recrystallization in toluene twice, yielding 43 g of bis(methylhydroxy)-triarylamine (III) (92%), or bis(4-hydroxymethylphenyl)-3,4-dimethylphenylamine. The structure of the desired product was confirmed by $^1H$ NMR spectrum. A diagram of the reaction is presented below:

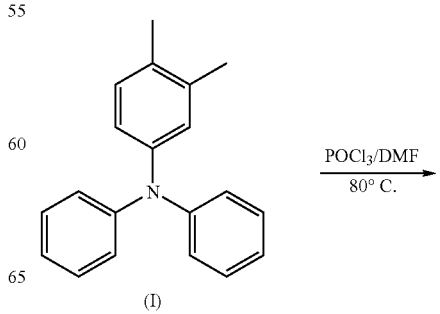

-continued

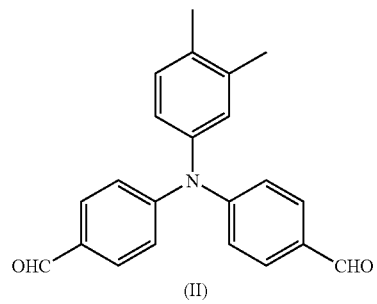
(II)

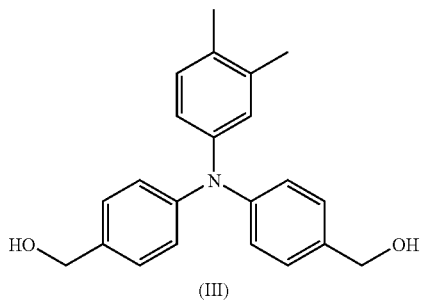
(III)

Preparation of PHTP

A mixture of p-cresol (0.32 g, 3 mmole), bis(4-hydroxymethylphenyl)-3,4-dimethylphenylamine (III) (1 g, 3 mmole), oxalic acid (0.004 g), 1 mL of toluene and dichlorobenzene (6 mL) was heated in a 100 mL round-bottom flask under an argon stream. The temperature was increased to 110° C. for about 4 h, then to 160° C. and held for 1 hour. The reaction mixture was cooled to 30° C. and diluted with dichloromethane (about 10 mL), then precipitated into methanol (about 300 mL). The resulting solids were collected by filtration and dried in air resulting in 1.01 g of crude polymer (79.5%). The crude polymer was dissolved in 40 mL of dichloromethane, then about 10 mL of methanol was added into the dichloromethane solution. The resulting solids were collected and dissolved in 5 mL of dichloromethane, then precipitated into methanol (300 mL). Filtering, drying in air gave 0.98 g of product (>75%). Molecular weights were measured by gel permeation chromatography; the $M_w$ was approximately 39,000 and the $M_n$ was approximately 9,000. The structure of the desired product was confirmed by $^1$H NMR spectrum. A diagram of the reaction is presented below:

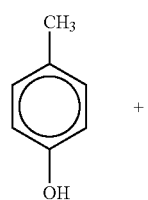

-continued (III)

EXAMPLE II

A Standard Photoreceptor Device (Control):

On a 75 micron thick titanized MYLAR® substrate was coated by draw bar technique a barrier layer formed from hydrolyzed gamma aminopropyltriethoxysilane having a thickness of 0.005 micron. The barrier layer coating composition was prepared by mixing 3-aminopropyltriethoxysilane with ethanol in a 1:50 volume ratio. The coating was allowed to dry for 5 minutes at room temperature, followed by curing for 10 minutes at 110° C. in a forced air oven. On top of the blocking layer was coated a 0.05 micron thick adhesive layer prepared from a solution of 2 weight percent of a DuPont 49K (49,000) polyester in dichloromethane. A 0.2 micron thick photogenerating layer was then coated on top of the adhesive layer with a wire wound rod from a dispersion of hydroxy gallium phthalocyanine Type V (22 parts) and a vinyl chloride/vinyl acetate copolymer, VMCH $M_n$=27,000, about 86 weight percent of vinyl chloride, about 13 weight percent of vinyl acetate and about 1 weight percent of maleic acid available from Dow Chemical (18 parts) in 960 parts of n-butylacetate, followed by drying at 100° C. for 10 minutes. Subsequently, a 24 μm thick charge transport layer (CTL) was coated on top of the above photogenerating layer by a draw bar from a solution of N,N'-diphenyl-N,N-bis(3-methylphenyl)-1,1'-biphenyl-4,4'-diamine (49.5 parts), 1 part of 2,6-di-tert-butyl-4-methylphenol (BHT) available from Aldrich Chemicals and a polycarbonate, MAKROLON® ($M_w$=52,000] available from Bayer (49.5 parts) in 667 parts of dichloromethane. The CTL was dried at 115° C. for 30 minutes.

EXAMPLE III

A Photoreceptor Device with PHTP Overcoat:

A photoreceptor device was prepared according to Example II. An OCL coating solution was prepared from a solution of a PHTP as represented by the monomer of Formula (IV) in methylene chloride with 10% solids.

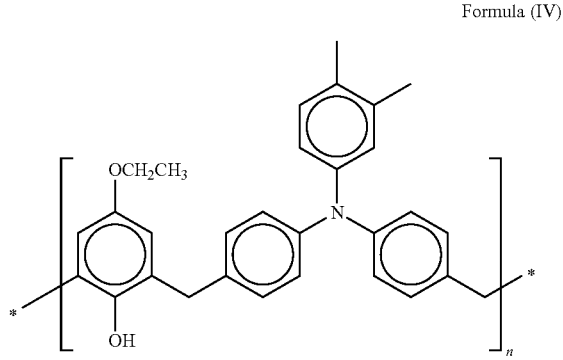

Formula (IV)

The coating solution was coated onto a photoreceptor device and heated at 130° C. for 10 min; the resulting OCL was 4.5 microns thick. The coated device was then subjected to a time zero electrical and deletion test. As a control, a photoreceptor device without the coating solution was used.

The xerographic electrical properties of the above prepared photoconductive imaging member and other similar members can be determined by known means, including electrostatically charging the surfaces thereof with a corona discharge source until the surface potentials, as measured by a capacitively coupled probe attached to an electrometer, attained an initial value $V_o$ of about −800 volts. After resting for 0.5 second in the dark, the charged members attained a surface potential of $V_{ddp}$, dark development potential. Each member was then exposed to light from a filtered Xenon lamp thereby inducing a photodischarge which resulted in a reduction of surface potential to a $V_{bg}$ value, background potential. The percent of photodischarge was calculated as $100\times(V_{ddp}-V_{bg})/V_{ddp}$. The desired wavelength and energy of the exposed light was determined by the type of filters placed in front of the lamp. The monochromatic light photosensitivity was determined using a narrow band-pass filter. The photosensitivity of the imaging member is usually provided in terms of the amount of exposure energy in ergs/cm², designated as $E_{1/2}$, required to achieve 50 percent photodischarge from $V_{ddp}$ to half of its initial value. The higher the photosensitivity, the smaller is the $E_{1/2}$ value. The $E_{7/8}$ value corresponds to the exposure energy required to achieve a ⅞ photodischarge from $V_{ddp}$. The device was finally exposed to an erase lamp of appropriate light intensity and any residual potential ($V_{residual}$) was measured. The imaging members were tested with a monochromatic light exposure at a wavelength of 780+/−10 nanometers, and an erase light with the wavelength of 600 to 800 nanometers and intensity of 200 ergs.cm².

Lateral image migration (LCM) was measured by the following procedure. Hand coated devices were cut into 6"×1" strips. One end of the strip was cleaned (using solvent) to expose the metallic conductive layer on the substrate. The conductivity of this layer should now have been measured to ensure that the metal had not been removed during cleaning. A multimeter was used to measure the resistance across the exposed metal layer (~1 KOhm). A fully operational 85 millimeter DC12 photoreceptor drum was prepared to expose a lengthwise strip of bare aluminum (0.5"×12"). The hand coated device was mounted onto the 8 millimeter DC12 photoreceptor drum using conductive copper tape to adhere the exposed conductive end of the device to the exposed aluminum strip on the drum thus completing a conductive path to ground. Once mounted, the device-to-drum conductivity was measured using a standard multimeter in resistance mode. The resistance between the device and the drum should be similar to the resistance of the conductive coating on the hand coated device. Once confident, the conductivity was high enough that the device ends were secured using scotch tape. All exposed conductive surfaces were covered with scotch tape. The drum was placed in the DocuColor 12 and a special template containing (1 bit, 2 bit, 3 bit, 4 bit, 5 bit) lines was printed. The machine settings (dev bias, laser power, grid bias) were adjusted to get a proper print on the hand coated devices. If the 1 bit line was barely showing, then the settings were saved and the print became the reference (pre-exposure print). The drum was removed and placed in a fume hood where specially made corotron housing was mounted onto the drum. The housing permitted a near air tight seal over the devices with the wire only a few millimeters from the devices. 500 μa (micro-amps) of current were run through the wire at 1 Hz alternating frequency for 20 minutes. The housing was then removed and the drum was placed back into the printer and another print was made which will show if any LCM has occurred. Several prints were made over lengthening time intervals to show the recovery of the exposed area on the devices. The results are presented in Table 1 below.

TABLE 1

| Sample | CTL Thickness (microns) | Vcor (V) | Vddp (V) | Dark Decay (500 ms) (V) | S (V · erg/cm²) | $E_{1/2}$ (erg/cm²) | $E_{7/8}$ (erg/cm²) | $V_r$ | Image Quality |
|---|---|---|---|---|---|---|---|---|---|
| PHTP | 29.5 | 4960 | 816 | 21 | 329 | 1.30 | 2.97 | 12 | good (5 minutes after exposure) |
| Control | 26.0 | 4840 | 818 | 27 | 351 | 1.21 | 2.85 | 14 | poor (5 minutes after exposure) |

As seen from the data in Table 1, the photoreceptor device with an OCL had an excellent photo-induced discharge curve (PIDC). The deletion test indicated that the OCL showed significantly improved deletion resistance compared with the control device. The OCL also showed self-curing properties; i.e., as it was heated to dry, it also cured.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A phenolic hole transport polymer represented by Formula (III):

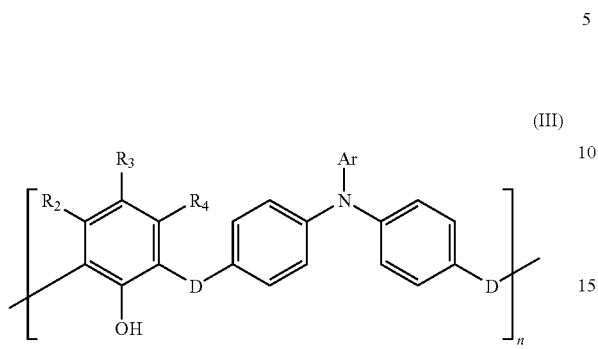

wherein $R_2$, $R_3$, and $R_4$ are independently selected from carbonylalkyl having from about 1 to about 20 carbon atoms, carboxylalkyl having from about 1 to about 20 carbon atoms, amine, hydroxyl, alkoxy having from about 1 to about 20 carbon atoms, aryloxy having from about 6 to about 60 carbon atoms, alkyl having from about 1 to about 30 carbon atoms, aryl having from about 6 to about 60 carbon atoms, halo-substituted alkyl having from about 1 to about 20 carbon atoms, hydrogen, and halogen; D is alkylene containing from 1 to 15 carbon atoms and optionally containing a heteroatom selected from the group consisting of oxygen sulfur, silicon, and nitrogen; Ar is a substituted or unsubstituted aryl or arylene group; and n is 2 to about 275.

2. The phenolic hole transport polymer of claim 1, wherein said polymer has an average molecular weight ranging from about 1,000 to about 100,000.

3. The phenolic hole transport polymer of claim 1, wherein D is methylene and Ar is 3,4-dimethylphenyl or biphenyl.

4. The phenolic hole transport polymer of claim 3, wherein D is methylene, $R_2$ and $R_4$ are hydrogen, $R_3$ is methyl or ethoxyl, and Ar is 3,4-dimethylphenyl.

5. The phenolic hole transport polymer of claim 1, wherein the hole transport polymer is selected from the group consisting of formulas (III-a) to (III-k):

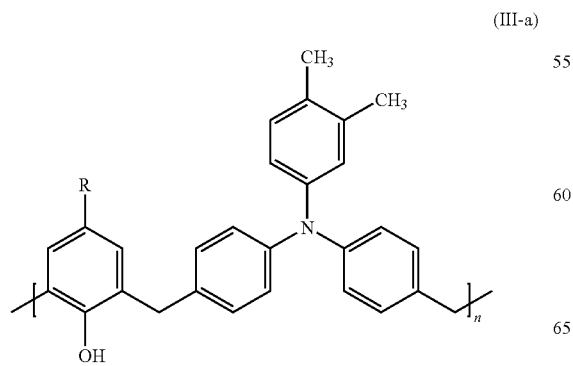

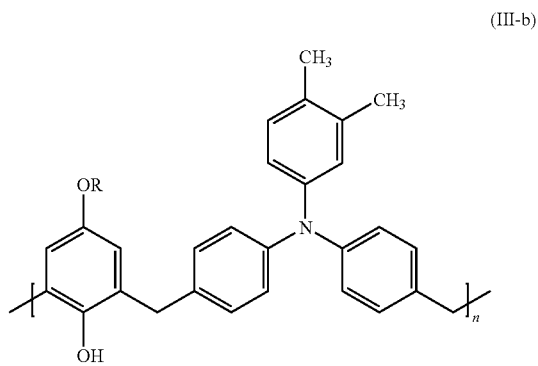

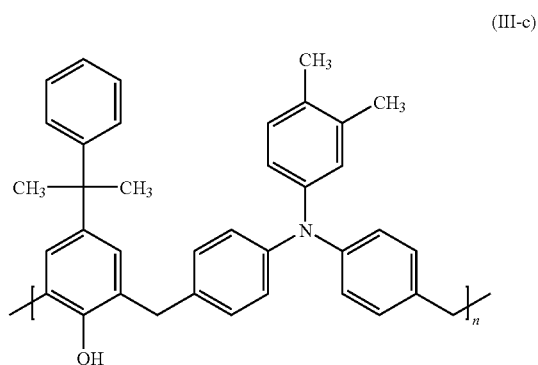

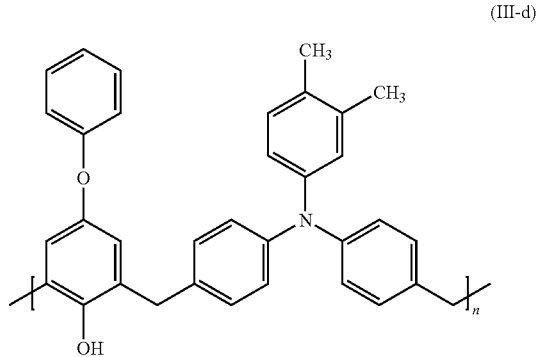

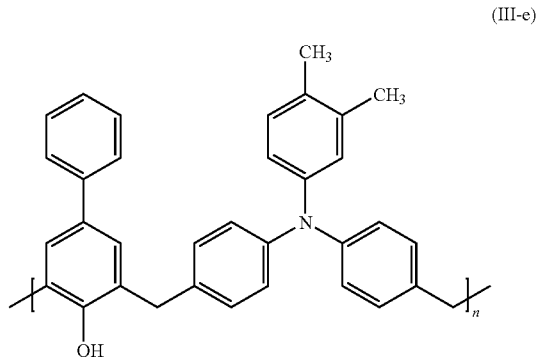

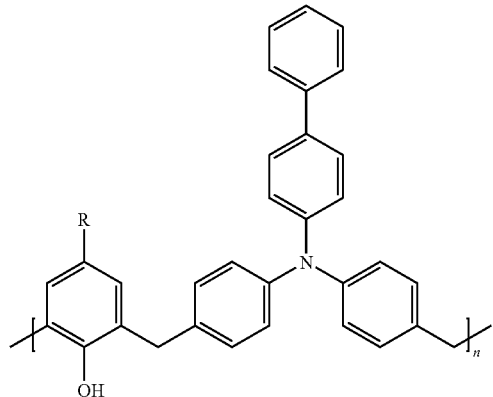
(III-f)
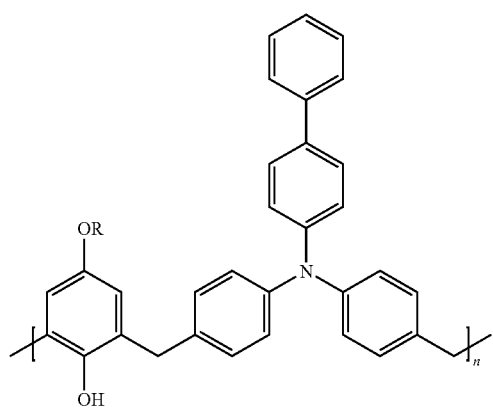
(III-g)
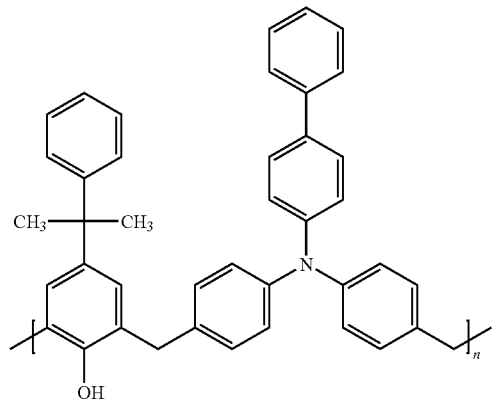
(III-h)
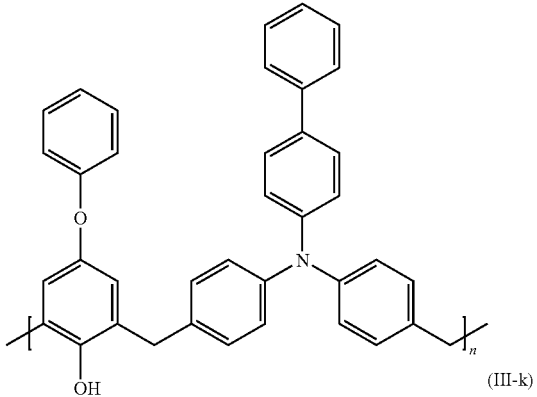
(III-j)
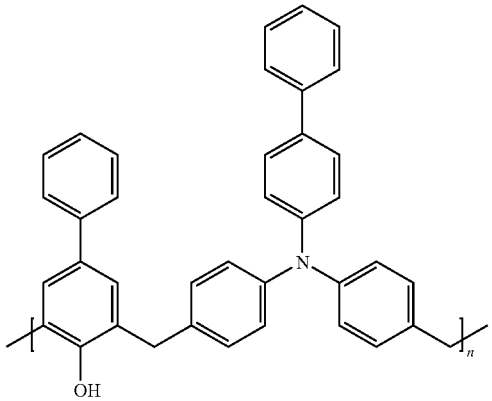
(III-k)
wherein R is alkyl or halo-substituted alkyl having from 1 to 20 carbon atoms.
6. A phenolic hole transport polymer of Formulas (III-m) or (III-p):
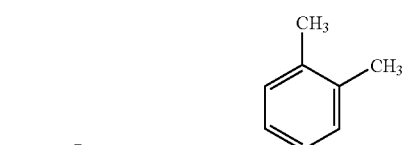
(III-m)
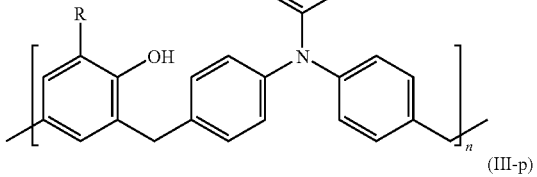
(III-p)

wherein R is alkyl or halo-substituted alkyl having from 1 to 20 carbon atoms; n is 2 to about 275; and the polymer has an average molecular weight ranging from about 1,000 to about 100,000.

7. An imaging member having a layer comprising a polymer, wherein the polymer is represented by Formula (III):

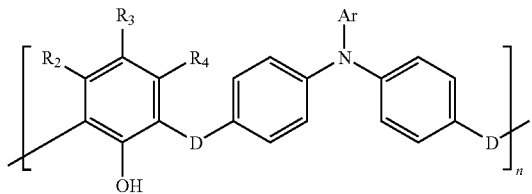

(III)

wherein $R_2$, $R_3$, and $R_4$ are independently selected from carbonylalkyl having from about 1 to about 20 carbon atoms, carboxylalkyl having from about 1 to about 20 carbon atoms, amine, hydroxyl, alkoxy having from about 1 to about 20 carbon atoms, aryloxy having from about 6 to about 60 carbon atoms, alkyl having from about 1 to about 30 carbon atoms, aryl having from about 6 to about 60 carbon atoms, halo-substituted alkyl having from about 1 to about 20 carbon atoms, hydrogen, and halogen; D is alkylene containing from 1 to 15 carbon atoms and optionally containing a heteroatom selected from the group consisting of oxygen sulfur, silicon, and nitrogen; Ar is a substituted or unsubstituted aryl or arylene group; and n is 2 to about 275.

8. The imaging member of claim 7, wherein said polymer has an average molecular weight ranging from about 1,000 to about 100,000.

9. The imaging member of claim 7, wherein the layer is a charge transport layer or an overcoat layer.

10. The imaging member of claim 7, wherein the phenolic hole transport polymer is crosslinked.

* * * * *